Dec. 22, 1936.  H. W. WICKES  2,064,964
BOMB SIGHT FOR DIVE BOMBING
Filed May 21, 1935   3 Sheets-Sheet 1
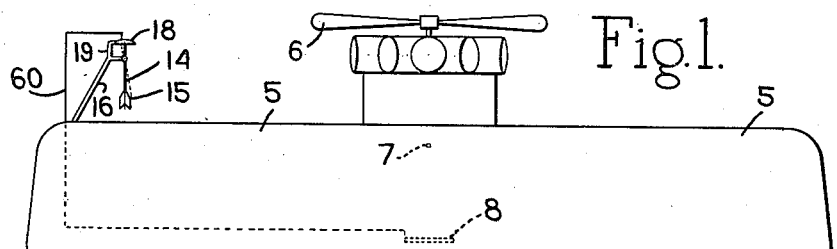
Fig.1.
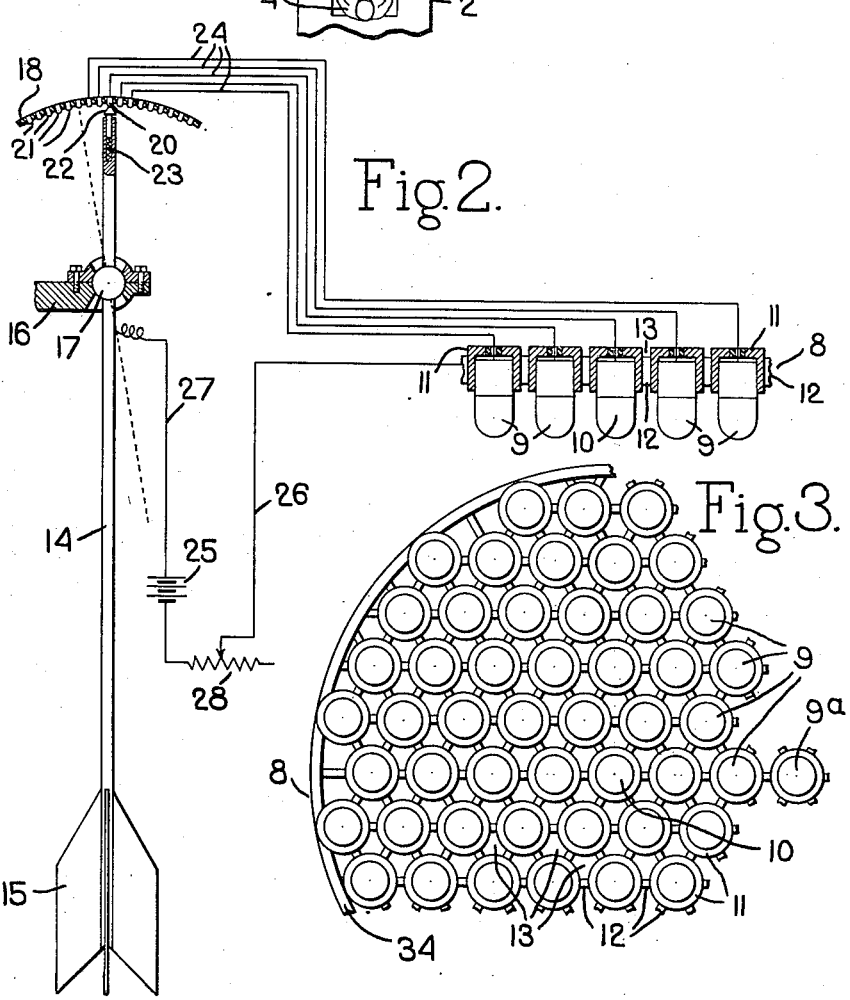
Fig.2.
Fig.3.
Inventor.
Henry W. Wickes
by Heard Smith & Tennant.
Attys.

Dec. 22, 1936.   H. W. WICKES   2,064,964
BOMB SIGHT FOR DIVE BOMBING
Filed May 21, 1935   3 Sheets-Sheet 2
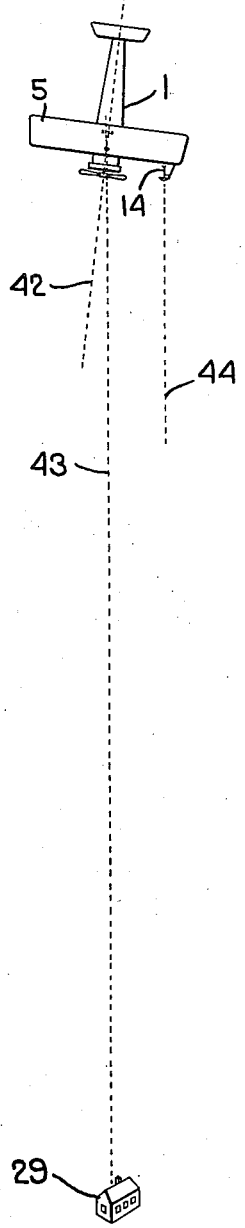
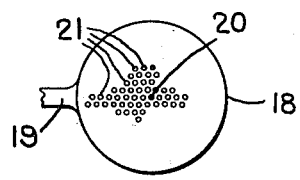
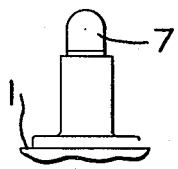
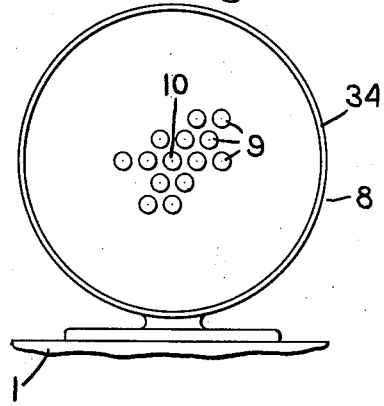
Inventor.
Henry W. Wickes
by Heard Smith & Tennant.
Attys.

Inventor.
Henry W. Wickes
by Heard Smith & Tennant
Attys.

Patented Dec. 22, 1936

2,064,964

UNITED STATES PATENT OFFICE 2,064,964

BOMB SIGHT FOR DIVE BOMBING

Henry W. Wickes, Winthrop, Mass.

Application May 21, 1935, Serial No. 22,666

9 Claims. (Cl. 177—351)

This invention relates to a sighting device for airplanes which is especially designed for dive bombing. Some of the factors which contribute to inaccuracy in aiming a bomb during dive bombing are skidding movement of the plane, spiralling movement of the plane, movement of the air mass through which the plane is traveling, the action of gravity on the bomb after it is released, movement of the airplane in a direction at right angles to the general plane of the wings and toward the upper surfaces thereof due to excessively high speed, etc.

One of the objects of the present invention is to provide a novel sighting device by which all errors in the aim of the bomb can be eliminated except such as are due to air mass movement and/or the action of gravity on the bomb after it has been released.

When an airplane is in flight, whether the flight be in a horizontal direction or in a vertical direction as in the case of dive bombing, a skidding movement of the airplane or a movement at right angles to the general plane of the wings and toward the upper surfaces causes a deviation of the actual direction of movement of the airplane from the direction of the fore-and-aft axis of the plane. (For convenience I will hereinafter refer to the movement of the airplane in a direction at right angles to the plane of the wings and toward the upper surfaces thereof during the vertical dive as "horizontal climb" because it is the same character of movement which is designated as "vertical climb" when a plane is flying horizontally except that in the case of dive bombing this movement is in a horizontal direction.)

When a bomb is released from an airplane during dive bombing the initial course which the bomb takes as it is released is in the direction in which the plane is actually moving. If at the time the bomb is released the plane has a side skidding movement or a horizontal climb, the actual direction of movement of the plane does not correspond to the fore-and-aft axis thereof, and in order to correctly aim the bomb the aviator should so manipulate his plane that the actual direction of movement is directly toward the target.

My improved sighting device provides novel means for indicating to the aviator or pilot the actual direction in which his plane is moving through the air and therefore provides a sight which will eliminate all errors due to the factors above-mentioned such as skidding movement or horizontal climb. If the bomb is mounted on the wings of an airplane at a distance from the axis thereof a spiralling movement of the plane during dive bombing will subject the bomb to a centrifugal action which introduces an additional error in aiming of the bomb. My improved bomb sight will also correct this error and hence in an airplane equipped with my sighting device all the errors affecting the aiming of the bomb are eliminated except that due to air mass movement and the action of gravity on the bomb after it is released.

My improved sighting device comprises a direction-indicating member which is mounted on the airplane so that it will be free from the influence of air turbulence caused by the propellers or by the structural parts of the plane moving through the air and will take a direction indicating the actual direction of movement of the airplane through the air, whether such direction coincides with or deviates from the fore-and-aft axis of the airplane.

If the airplane construction is such that this direction indicator may be situated directly in front of the pilot then he may use it as the sighting device, in which case he will aim his bomb during dive bombing by so manipulating his plane that the free-flying sighting device is directed toward the target.

If the airplane construction is such that it is necessary to mount the direction indicator on the ends of the wings or in some other location remote from the pilot in order to prevent said indicator from being influenced by air turbulence caused by the propeller or structural parts of the airplane then I propose to provide a suitable transmitting device which will transfer to suitable sighting elements in front of the pilot the direction which the direction indicator has, and hence the direction in which the airplane is actually moving through the air, so that by using these sighting devices which are controlled by the direction indicator the aviator may correctly aim his bomb.

Since my improved sighting device does not eliminate the error due to air mass movement or that due to the action of gravity on the bomb after it is released the aviator will have to make necessary compensation for these factors. The amount of compensation necessary to allow for each factor, that is, for air mass movement and for the action of gravity on the bomb after it is released, has been computed and tabulated for different speeds and elevation and is readily available to anyone so that by noting the necessary correction for the above-mentioned two factors, to wit, air mass movement and the action of gravity on the bomb after it is released, the aviator can readily make the necessary compensation when he gets ready to release the bomb.

In order to give an understanding of the invention I have illustrated in the drawings a selected embodiment thereof which will now be described after which the novel features will be pointed out in the appended claims.

Fig 1 is a partial plan view of a plane equipped with my improved bomb sight.

Fig. 2 is a diagrammatic view illustrating the sight-controlling member and a portion of the sight having a movable operative position.

Fig. 3 is a fragmentary front view of the sight shown in Figure 2.

Fig. 4 is an elevation of the contact plate which co-operates with the sight-controlling member to determine which lamp or lamps are lighted.

Fig. 5 is a view illustrating the operation of the sight in vertical dive bombing.

Fig. 6 is a view of the fixed sight.

Fig. 7 is a front view of the movable contact.

Figure 8:
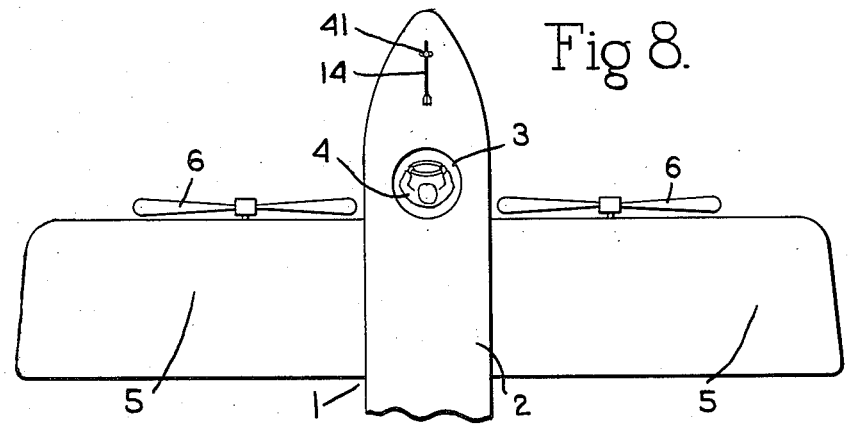
Fig. 8 is a view showing a slightly different embodiment of the invention.

In the drawings 1 indicates generally a bombing plane which is provided with the usual body or fuselage 2 having the cockpit 3 for the pilot 4. 5 indicates the wings of the plane and 6 the propeller or propellers.

My improved sighting device comprises a direction-indicating member 14 in the form of a vane which is mounted so that it is free to fly into the air mass through which the plane is moving and which indicates the actual direction in which the plane is traveling through the air regardless of any skidding or spiralling or horizontal climbing movement of the plane. This direction indicator is in the form of an arrow having feathers or vane members 15 at its rear end and it is mounted on a suitable support so as to have a free but limited turning movement in any direction about a fixed point and situated in a position in which it is uninfluenced by the turbulence of the air caused by the propeller or by structural parts of the airplane. In the case of an airplane having propellers 6 on the wings as shown in Fig. 8 the direction indicator 14 may be mounted directly in front of the pilot.

While any convenient way of mounting the direction indicator so as to permit it to fly freely into the relative air movement may be employed, I have herein shown said direction indicator as provided with a ball portion 17 which is mounted in a socket 40 formed on a supporting bracket 41.

The position which the direction indicator 14 assumes during dive bombing indicates the actual direction in which the plane is moving through the air and when the direction indicator is mounted as shown in Fig. 8 it may be used by the pilot as the sight for training the bomb on the target, in which case the pilot will manipulate his plane so that when he sights along the direction indicator he finds it pointed directly at the target. If the dive is a vertical dive the gravity error will be zero and hence the only error which the aviator has to compensate for is that due to air mass movement, and the correct compensation can be easily made by consulting data which is available to all in tabulated form.

Where the airplane construction is such as shown in Fig. 1 it will be necessary to place the direction indicator near the ends of the wings and also in front of the wings in order to prevent it from being influenced by the turbulence of the air caused by the propeller and the structural parts of the airplane. Where it is necessary to locate the direction indicator at a distance from the aviator I propose to provide an indicating device situated in front of the pilot 15 and which serves to indicate accurately the direction of the direction indicator 14, thereby enabling the pilot to correctly aim his bomb. The indicating device herein illustrated comprises a sight 7 which has a fixed position on the airplane in front of the pilot and which for convenience will be referred to as a "fixed sight" and a second sighting member 8 which is situated either in front of or in the rear of the fixed sight and which is provided with a sighting element capable of assuming any one of a plurality of operative positions in any direction at right angles to the fore-and-aft axis of the plane but incapable of movement toward or from the fixed sight. The operative position of said sighting element is controlled by the movement of the direction indicator 14, so that an imaginary line drawn through the fixed sight 7 and the operative position of the sighting element is parallel at all times to the direction indicator 14.

In the construction shown in Fig. 1 the second sighting member is shown as situated between the fixed sight 7 and the pilot. This second sighting member may be made in various ways but I have herein shown it as composed of a plurality of small electric lights 9 which are arranged about a center light 10, said lights being spaced from each other to provide openings between them through which the operator may see the fixed sight 7 and also the target. These electric lights are shown as being mounted in suitable sockets 11 and the sockets are held spaced from each other by connecting bars 12. This arrangement provides spaces 13 between adjacent lamps through which the operator can see the fixed sight and also the target. The second sighting member is, therefore, a sort of grid work construction supporting the separate lamps 9. The center lamp 10 is in a direct line fore-and-aft with the fixed sight 7 and the other lights 9 are clustered symmetrically about the center light 10. This cluster of lights may be held in a suitable frame 34 which is secured to the plane in any suitable way.

The movable feature of the second sighting member consists in means adapted to light the particular lamp or lamps 9 which are so situated relative to the longitudinal axis of the plane that an imaginary line extending from the lighted lamp or lamps to and through the fixed sight 7 is parallel to the direction indicator 14 and hence parallel to the actual direction in which the ship is moving through the air. Means are provided whereby when the direction indicator member 14 has a position parallel to the axis of the plane the center light 10 will be lighted and whereby whenever the arrow takes an angular position one of the lights 9 will be lighted depending upon the angular position of the arrow. For this purpose I have provided a contact plate 18 of insulating material situated in front of the direction indicator 14 and mounted on an arm 19 extending from the bracket 16. This contact plate 18 has a spherical curvature and is provided with a center contact 20 and a plurality of other contacts 21 arranged symmetrically about the center contact, there being as many contacts 21 as there are lamps 9. The forward end of the member 14 is provided with a contact 22 which engages the various contacts 20, 21 as the direction indicator member 14 turns about its universal joint 17. This contact 22 is shown as mounted in a socket in the end of the member 14 and as being backed by a spring 23 so that the contact element 22 will have a yielding engagement with the various contacts 20, 21. Each of the contacts in the contact plate 18 is connected to one of the lamps by a circuit connection 24, the center contact 20 being connected to the center lamp 10 and each contact 21 being connected by its circuit connection 24 to a lamp 9 which has the same angular relation to the center lamp that the corresponding contact 21 has to the center contact 20, but which has a position in the frame 34 diametrically opposite that of the corresponding contact in the plate 18.

The lamps 9, 10 are shown as being energized from a suitable battery or source of electricity 25 which is connected to the frame 34 through a circuit connection 27. 28 indicates a rheostat which may be employed if desired. The direction indicator 14 will be insulated preferably from the body of the airplane and the circuit connecting the direction indicator and contacts 20, 21 with the lamps 9, 10 will be a two-wire circuit.

The sighting device shown in Figs. 1 and 5 is used as follows. If it be assumed that the object 29 is the target the bomber intends to bomb, he will then take a position at the proper elevation and go into a vertical dive toward the target. If he is not skidding or spiralling and the plane has no horizontal climb then the direction indicator 14 will take a position parallel to the longitudinal axis of the plane and the contact 22 will engage the center contact 20, thus lighting the center light 10. The pilot manipulates his plane so as to bring the lighted lamp 10, the fixed sight 7 and the target into line with each other and maintains this condition until it is time to release the bomb. The operative lighted lamp 9 and the fixed sight 7 establish a sighting line along which the pilot sights in spotting the target to be hit. It will be understood, of course, that the pilot will make any compensation necessary for air mass movement error before he releases his bomb.

If, however, during the vertical dive the plane has a skidding movement or a spiralling movement or a horizontal climb then the actual direction in which the plane is moving will not be parallel to the fore-and-aft axis of the plane and the axial line of the plane will be directed to one side of the target as shown in Fig. 5 wherein the axial line of the plane is indicated at 42. The actual direction in which the airplane is moving will be indicated by the position of the direction-indicating member 14 which will have an angular position to the fore-and-aft axis of the airplane as shown by line 44 in Fig. 5. This angular position of the member 14 will cause one of the lamps to be lighted as indicated by the lamp 9—a and the operator will manipulate his controls so as to bring the lighted lamp 9—a, the fixed sight 7 and the target into line with each other as shown by the dotted line 43.

When this condition exists the pilot knows that his plane is moving directly toward the target notwithstanding its skidding movement or any spiralling movement which it may have and hence when the bomb is released it will be traveling directly toward the target, and the only factor which would cause an error would be the air mass movement, compensation for which can be easily made from tables which have been prepared and are available to all giving the amount of error to be compensated for at different speeds and different altitudes.

In using the device shown in Fig. 8 the aviator employs the direction indicator 14 as the sight and when he gets ready for the vertical dive he will manipulate the plane so that when sighting along the direction indicator he finds it pointed directly at the target.

It will be understood, of course, that in this case also the necessary compensation will have to be made for error due to air mass movement.

In the case of a vertical dive, therefore, my improved sighting device eliminates all errors which would cause the bomb to be diverted from its sighted course except that due to the air mass movement.

If the dive is not a vertical dive then there will also be the error due to the action of gravity on the bomb after it is released but this also is an error which can be readily compensated for by consulting tabulated information with which the pilot will be provided.

Figure 9:
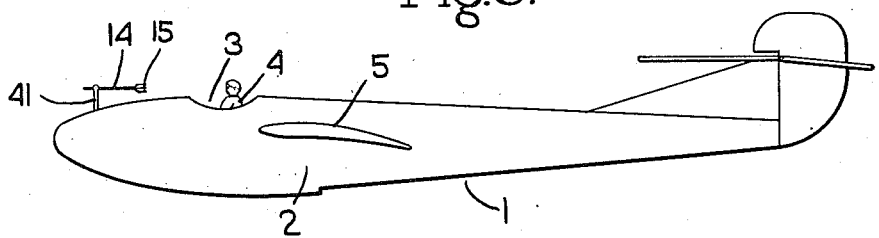
Fig. 9 is a side view of an airplane having the sighting device shown in Fig. 8, the propellers being omitted.
Figure 10:
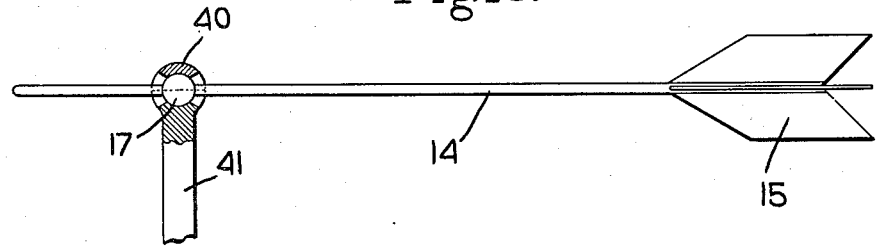
Fig. 10 is an enlarged view of the sighting device shown in Fig. 8.

The embodiment of the invention shown in Figs. 8 and 9 is used in the same way as that shown in Figs. 1 to 3 except that the aiming of the bomb is accomplished directly along the direction-indicating member 14. After the pilot starts the dive he manipulates the controls so that the direction-indicating member 14 will point at the target, and as this member 14 is directly in front of the pilot he can determine when it is pointed at the target by sighting along its length.

In order to make it easier for the pilot to use the sighting device shown in Figs. 1, 2, 3, I will preferably use a different colored light for the fixed light than for the lamps 9, 10. The fixed light 7, for example, might be a red lamp and the lamps 9, 10 might be white lamps or lamps of some other color. The use of two different colors makes it easier for the pilot to line up the lighted lamps with the target. In the construction shown in Figs. 1 to 3 wherein the sighting member 8 having the movable sighting element is situated between the pilot and the fixed sight the wiring 24 connecting the contacts 21 with the lamps 9 is so arranged that any lamp and its corresponding contact are situated diametrically opposite to each other with respect to the center lamp and center contact.

If, however, the fixed sight 7 and the sighting member 8 are arranged so that the fixed sight is situated between the sighting member 8 and the pilot, then the wiring 24 would be arranged so that each lamp would not only have the same angular relation to the center lamp that the corresponding contact has to the center contact but would be on the same side of the center lamp as said center contact. From the above it will be understood that my improved sighting device is constructed so that it provides a sighting line along which the pilot sights in spotting the target to be hit together with means actuated by the movement of the plane to maintain such sighting line substantially parallel to the actual direction of the plane through the surrounding air.

While I have illustrated some selected embodiments of my invention, yet I do not wish to be limited to the constructional features shown.

I claim:

1. A sighting device for airplanes for use in dive bombing comprising a direction-indicating member and means for mounting it on the airplane in a position in which it is not appreciably influenced by the air turbulence caused by the propellers or structural parts of the plane and so that it is free to have a limited turning movement in any direction whereby during the flight of the plane said indicator points in the direction in which the plane is moving relative to the surrounding air.

2. A sighting device for airplanes for use in dive bombing, comprising a direction-indicating member, means for mounting it on the airplane in a position in which it is not appreciably influenced by the air turbulence caused by the propellers or structural parts of the plane and so that it is free to have a limited turning movement in any direction about a center point, whereby during the flight of the plane said indicator points in the direction in which the plane is moving relative to the surrounding air and means in the immediate vicinity of the pilot's cockpit to indicate to the pilot the direction in which the direction-indicating member is pointing.

3. A sighting device for airplanes for use in dive bombing, comprising a fixed sight, a second sighting means capable of indicating any one of a plurality of sighting positions, said fixed sight and second sighting means being situated in front of the pilot and spaced from each other and means for automatically maintaining the sighting position of the second sighting means in a position in a line passing through the fixed sight and which is parallel to the actual direction of motion of the plane through the air.

4. A sighting device for airplanes for use in dive bombing comprising a fixed sight carried by the plane in front of the pilot, a second sighting means spaced from the fixed sight and also situated in front of the pilot, said second sighting means being capable of indicating any one of a plurality of sighting positions, a direction indicator pivotally mounted on the plane so as to be free to fly into the relative air flow during the flight of the plane and means actuated by said direction indicator to maintain the sighting position of said second sighting means in a position in a line passing through the fixed sight and which is parallel to the actual direction of motion of the plane through the air.

5. A bombing sight for an airplane comprising a fixed sight, a second sighting member presenting a plurality of electric lamps spaced slightly from each other to provide sight openings between them, a direction indicator pivotally mounted on the plane so as to be free to fly into the relative air flow during the flight of the plane, a contact plate having a plurality of contacts, one for each lamp, adapted to be engaged by the direction indicator as it turns about its pivot and means electrically connecting each contact to the corresponding lamp whereby engagement of the direction indicator with the various contacts causes the corresponding lamps to be lighted and the direction which the direction indicator takes during the flight of the plane is indicated by a line passing through the lamp which is lighted and the fixed sight.

6. A sighting device for airplanes for use in dive bombing comprising means situated in front of the pilot's seat and constituting a sighting line along which the pilot sights in spotting the target to be hit, and means actuated by the movement of the plane to maintain such sighting line substantially parallel to the actual direction of motion of the plane through the surrounding air.

7. A sighting device for airplanes for use in dive bombing comprising a direction-indicating member mounted on the airplane for free turning movement in any direction and in a position in which it is not appreciably influenced by air turbulence caused by the propeller or structural parts of the plane, a fixed sight secured to the plane in front of the pilot, a second sighting device capable of indicating any one of a plurality of sighting positions, and means controlled by the direction-indicating member to maintain the sighting position of said second sighting device in a line extending through the fixed sight and which is substantially parallel to the actual direction of movement of the airplane through the surrounding air mass.

8. A sighting device for airplanes for use in dive bombing comprising a fixed sight secured to the plane in front of the pilot, a rear sighting means situated between the fixed sight and the pilot and capable of indicating any one of a plurality of sighting positions in any direction at right angles to the horizontal axis of the plane, and means controlled by the movement of the plane for automatically maintaining the sighting position of said rear sighting means in a line passing through the fixed sight and which is parallel to the actual direction of movement of the plane through the air.

9. A sighting device for airplanes for use in dive bombing comprising a fixed sight secured to the plane in front of the pilot, a rear sighting means situated between the fixed sight and the pilot and capable of indicating any one of a plurality of sighting positions, and means for automatically maintaining the sighting position of the rear sighting means in a line passing through the fixed sight and which is parallel to the actual direction of motion of the plane through the air.

HENRY W. WICKES.